Patented Mar. 19, 1940

2,193,818

UNITED STATES PATENT OFFICE 2,193,818

PROCESS FOR PRODUCING PROTEIC COATING OR FILM UPON FIBER, TEXTILE, OR THE LIKE

Toshiji Kajita, Ryohei Inoue, and Akira Yamanouchi, Tokyo, Japan, assignors to Showa Sangyo Kabushiki Kaisha, Tsurumiku, Yokohama, Japan No Drawing. Application September 8, 1937, Serial No. 162,956. In Japan July 19, 1937

2 Claims. (Cl. 91—68)

The present invention relates to an improved process for coating or sizing various kinds of fiber or textile fabrics with protein. The invention consists in the extraction of protein from soya bean with a dilute alkaline solution and precipitating said protein by adding suitable acids or metallic salts to the said solution. The protein precipitate thus obtained is then washed with water, and a suitable amount of water allowed to remain. Sugar or tartaric acid is then added to said precipitate as a stabilizer and subsequently the mixture is dissolved in alkaline solution. The solution after suitable maturing is then impregnated in the fibers or textiles mentioned above. The impregnated fibers or textiles are then treated with an acid bath which may contain suitable organic coagulating agents.

According to the process of the present invention, sugar or tartaric acid is added to the protein precipitate in order to prevent the oxidation or decomposition of the protein especially during the step of maturing. When the said solution is submitted to maturing, the particles of protein are believed to separate into smaller particles, so that a homogeneous solution can be obtained which can be impregnated easily into the fibers or textile fabrics. This coating or sizing is stable and is very pliant to the touch and has excellent dyeing qualities. A protein coating or sizing produced from a protein solution which has not been submitted to maturing is very hard and not pliable.

An advantage of the present invention is that the protein solution can be rapidly coagulated by treating in an acid bath, which may contain organic coagulating agents. Consequently in the present invention, the fibers or textile fabrics which are treated with the protein solution and acid bath do not adhere to each other.

Example

The residue of soya bean, after extraction of oil, containing 40 to 47% protein, is extracted with a dilute alkaline solution, e. g., 0.2 to 2% ammonia water or caustic alkali solution, the quantity of solution being about 5 to 10 times said residue, at a temperature of 20 to 30° C. for 2 to 5 hours, whereby protein in the amount of 10 to 20% of the total amount of raw material may be extracted. The extracted solution is purified by means of a dilute sodium peroxide solution together with animal charcoal or potter's clay and filtered. To the clear solution thus obtained, is added an acid, such as acetic, sulphuric, phosphoric or the like, or metallic salts of acids, such as copper sulphate, zinc sulphate, zinc acetate, copper acetate etc., until the solution shows acidic reaction and the protein is precipitated. The precipitate thus obtained is thoroughly washed with water to remove adhering salts and acids, and separated by filtering.

Then, sugar or tartaric acid is added as stabilizer, in an amount of 0.2 to 0.5% to said precipitate which contains 75 to 85% of water. Subsequently, the said mixture is well mixed in an alkaline solution of a concentration of 3 to 7% and then filtered and the bubbles removed. This mixture is then left for maturing at a temperature of 10 to 20° C., for 2 to 3 days. A fiber, for example, staple fiber of wood cellulose is soaked in the solution mentioned above, at room temperature for 1 to 2 hours and then subjected to a centrifugal machine to remove excess liquids. This fiber is then treated in an acid bath which may contain a suitable organic coagulating agent, such as alcohol, formaldehyde, acetone, etc., at the rate of 10 to 20%. Finally the coated product is dried at 50 to 60° C.

What we claim is:

1. A process for coating or sizing fibers and fabrics which consists in impregnating said fibers with a matured protein solution obtained by extracting the protein from the soya bean with alkaline solution, said protein solution containing a stabilizing agent selected from the group consisting of sugar and tartaric acid and finally treating the impregnated fibers in an acid bath to coagulate the protein.

2. The process as claimed in claim 1, wherein the acid bath contains an organic coagulating agent selected from the group consisting of formaldehyde, acetone and alcohol.

TOSHIJI KAJITA.
RYOHEI INOUE.
AKIRA YAMANOUCHI.